Jan. 29, 1957 R. C. MECUM ET AL 2,779,450

DEVICE FOR CONTROLLING CONTINUOUS PREFOLDED FORMS FOR ACCOUNTING AND TYPEWRITING MACHINES

Filed Dec. 5, 1955 2 Sheets-Sheet 1

INVENTORS,
ROBERT C. MECUM
CHARLES F. EVANS
BY [signature]
ATTORNEY.

INVENTORS,
ROBERT C. MECUM
CHARLES F. EVANS
BY Drayton L. Lathrop
ATTORNEY

United States Patent Office 2,779,450

Patented Jan. 29, 1957

2,779,450

DEVICE FOR CONTROLLING CONTINUOUS PREFOLDED FORMS FOR ACCOUNTING AND TYPEWRITING MACHINES

Robert C. Mecum and Charles F. Evans, Madison, Wis.

Application December 5, 1955, Serial No. 551,123

3 Claims. (Cl. 197—133)

This invention relates to a device for guiding continuous prefolded forms and is used in connection with form stands for accounting and typewriting machines.

Our invention is designed to correct a widespread difficulty arising out of the use of prefolded continuous forms in accounting or typewriting machines. The forms are designed to automatically refold. But static electricity on the form stand causes them to bunch up and fall back into the printing mechanism and in addition their weight is not sufficient to cause them to refold in a neat pile after they descend from the form stand. The difficulty is particularly acute when lightweight forms are used, but is also prevalent even when heavy weight forms are used.

The object of our invention is to provide a simple means for guiding continuous prefolded forms so that upon ejection from the accounting or typewriting machine, the forms will automatically refold in a stack.

The following is a description of our invention and of the best mode contemplated by us for carrying out our invention.

In the accompanying drawing, Figure 1 is a perspective view of our device.

Figure 1:
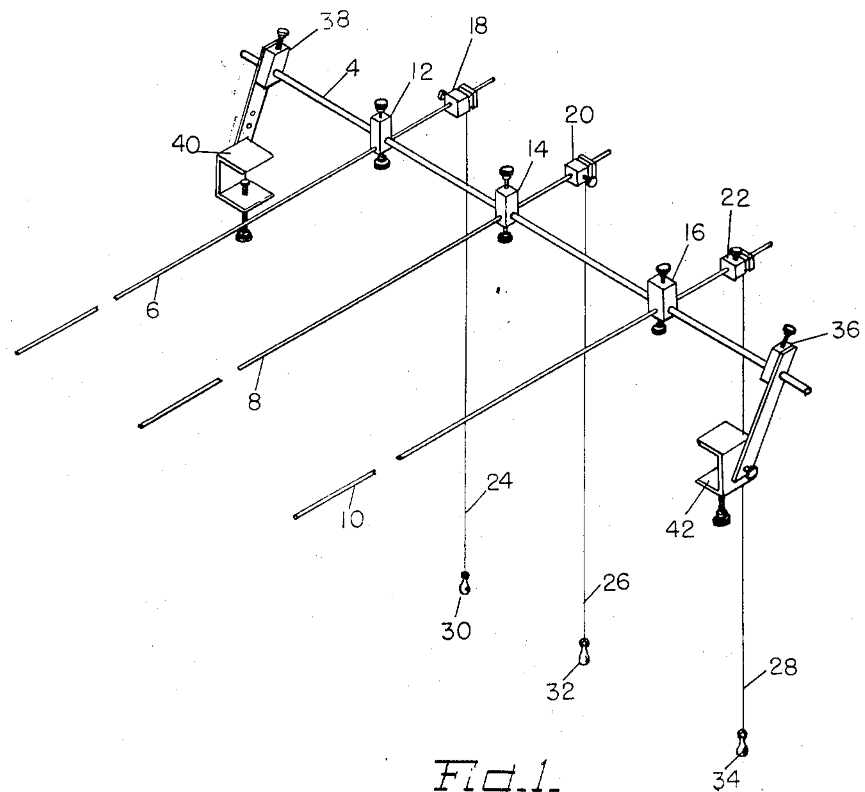

Referring to Figure 1, the rod 4 is held in place by the adjustable clamps 36 and 38, which in turn are pivotally attached to the adjustable clamps 40 and 42. The clamps 40 and 42 are used to attach our device to the form stand of an accounting machine. The rods 6, 8, and 10 are held in place by the adjustable clamps 12, 14, and 16, which latter clamps also are adjustably clamped onto the rod 4. The light weight wires 24, 26, and 28 are wound around and tied to the adjustable clamps 18, 20, and 22, which latter clamps are clamped to the members 6, 8, and 10. The weights 30, 32 and 34 are suspended from the clamps 18, 20, and 22 by the wires 24, 26, and 28.

Figure 2:
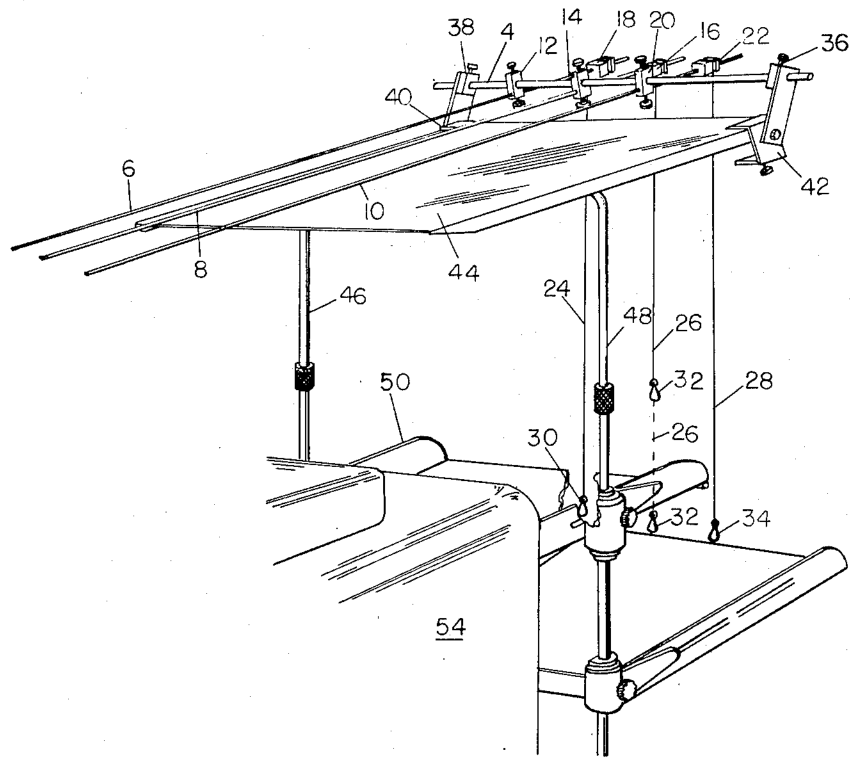
Figure 2 is a perspective view of our device in place on the form stand of an accounting machine.

In Figure 2 the device of Figure 1 is shown clamped to the form stand of an accounting machine so that the member 4 is located in a position transverse to and above the form stand and the members 6, 8, and 10 are located longitudinally to and above the form stand. The clamps 40 and 42 are clamped to the top of form stand 44. Said stand is held in place by the standards 46 and 48 which also support the shelves 50 and 52. A portion of the accounting machine is designated as number 54. The member 26 is shown in two different positions. The balance of the parts shown in Figure 2 have the same numbers as they have in Figure 1. In Figure 2 the form stand 44 is shown in an elevated position to facilitate reading and checking of the printed or typewritten material.

Figure 3:
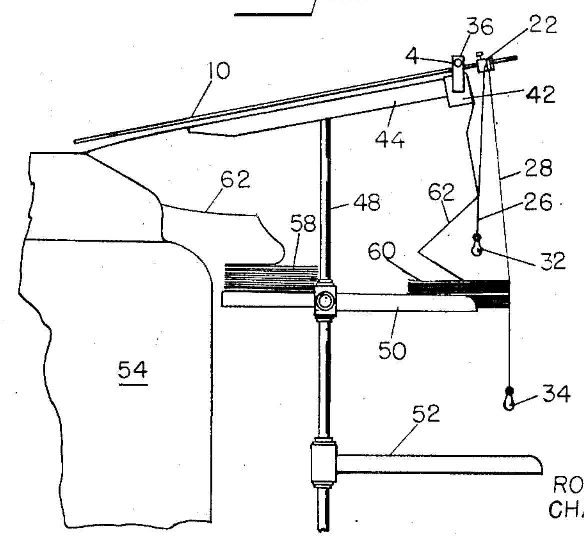
Figure 3 is a side elevation view of our device on the form stand shown in Figure 2 and also shows the stack of forms prior to entry into the accounting machine and after ejection from the accounting machine.

In Figure 3, the number 58 designates an unused stack of continuous forms. The number 60 designates a stack of continuous forms after they have been ejected from the accounting machine. The number 62 designates the continuous forms as they progress through the accounting machine, over the form stand and descend down to the stacking shelf. The other numerals in Figure 3 designate the same parts as shown in Figure 2.

Figure 4:
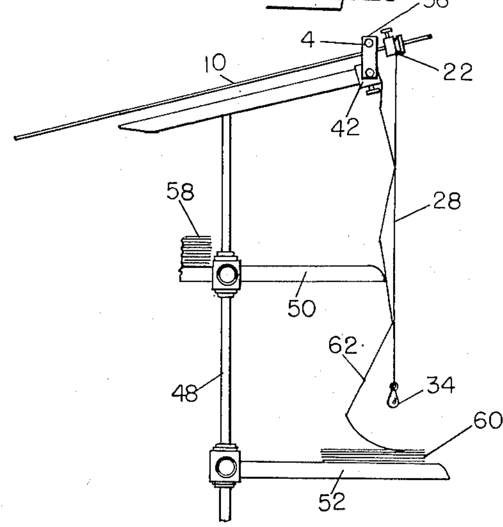
Figure 4 is a partial side elevation view of our device and of the form stand shown in Figure 2 and also shows, in a location different from that shown in Figure 3, the stack of forms after they have been ejected from the accounting machine.

In Figure 4, the numerals designate the same parts as they did in Figure 3. Figure 4 shows the forms 62 being restacked in stack 60 on the lower shelf 52.

We prefer to use an extra fine wire for the parts designated as numbers 24, 26, and 28. However, nylon thread or string may be used. The weights 30, 32 and 34 weigh substantially 2½ ounces each. The weights we use are made of lead, or other relatively heavy material. The heaviness of the weights may be varied. The members 24, 26, and 28 are sometimes referred to in this application as "string members." When that term is used, it is intended to refer to lightweight wire, thread, string and other equivalent material. The device we have made is constructed entirely of aluminum except for the string members and weights. However, other metals or alloys such as brass or steel and other materials of sufficient strength may be used.

In the usual procedure, the shelf 50 is used for stacking forms prior to typewriting and the shelf 52 is used for the stacking of the forms after the completion of the typewriting. Usually the stacking shelf is placed at a low level so that the weight of the forms will tend to counteract the effect of static electricity on the form stand. By the use of our device, as is shown in Figure 3, shelf 50 can also be used for the stacking of forms after they have been completed. When shelf 50 is used, the members 24 and 28 and the weights 30 and 34 extend below shelf 50 as shown in Figure 2 and the member 26 is shortened as appears in Figures 2 and 3. When the device is so used, the members 24, 28, 30, and 34 remain stationary, and the members 24 and 28 bear upon the outside of the stack of completed forms. The members 26 and 32 are located substantially adjacent to the front of the form and swing in harmony with the movement of the forms.

When, as is shown in Figure 4, the shelf 52 is used for stacking the completed forms, the member 26 is lengthened so that each of the members 30, 32 and 34 is suspended by a string member of substantially equal length to the other string members. The members 24, 26, 28, 30, 32, and 34 are placed substantially adjacent to the front of the forms and swing in harmony with the movement of the forms.

The members 6, 8, and 10 are placed a distance sufficiently above the top of the form stand 44 so as to permit the passage of forms over the top of the form stand. Usually such distance may be between ½ inch and an inch. However, on days when static electricity is particularly bothersome, the members 6, 8, and 10 should be placed so that said distance is only great enough to permit passage of the forms. We prefer to have the members 6, 8, and 10 extend to the platen of the accounting or typewriting machine.

The members 6, 8, and 10 and the members 24, 26, 28, 30, 32, and 34 coact to produce the result of a neatly stacked pile of completed forms.

The length of the members 24, 26 and 28 (Figure 2) is readily adjustable so as to compensate for the increase in height of the stack 60 (Figures 3 and 4). Also the members 18, 20 and 22 are slidably adjustable upon the members 6, 8 and 10 so as to compensate for forms of varying thickness. The clamps 12, 14 and 16 may be moved back and forth on the member 4 so as to adjust for forms of various widths. The members 6, 8, and 10 are slidably adjustable in the clamps 12, 14 and 16 so as to allow for varying distance between the platen of the accounting machine and the forms stand.

While we have described a preferred embodiment of our invention, it will be understood that this is to be taken as illustrative and not limitative and that changes in form, construction, and arrangement of parts may be made without departure from the scope of our invention. For example, the number of the members guiding the forms on the top of the forms stand and the number of the string members and weights may be varied.

Having described our invention, our claims follow.

We claim:

1. An attachment for guiding continuous prefolded forms used in connection with form stands for accounting and typewriting machines, comprising in combination rod members located longitudinally to and sufficiently above the form stand to permit the passage of forms over the top of the stand; means for holding said rod members in said position; string members for suspending weights in front of the forms as they descend from the form stand; weights suspended by said string members; and means for holding said string members and the weights attached thereto substantially adjacent to and in front of said forms as they descend from the form stand, whereby the weights and string means will swing in harmony with said forms.

2. An attachment for guiding continuous prefolded forms used in connection with form stands for accounting and typewriting machines, comprising in combination string members for suspending weights in front of the forms as they descend from the top of the form stand; weights suspended by said string members; and means for holding said string members so that the weights will be substantially adjacent to and will swing in harmony with the movement of the forms.

3. An attachment for guiding continuous prefolded forms used in connection with form stands for accounting and typewriting machines, comprising in combination means for keeping the forms flat on top of the form stand; weight suspending means; weights suspended by said weight suspending means; and means for holding said weight suspending means and the weights attached thereto substantially adjacent to and in front of the forms as they descend from the form stand so that the completed forms will necessarily be guided into a refolded stack thereby.

References Cited in the file of this patent

UNITED STATES PATENTS

| | | |
|---|---|---|
| 2,015,510 | Biele | Sept. 24, 1935 |
| 2,665,498 | Mitchell | Jan. 12, 1954 |